United States Patent
Moriwaki

(10) Patent No.: US 9,261,914 B2
(45) Date of Patent: *Feb. 16, 2016

(54) FLEXIBLE DISPLAY DEVICE AND METHOD OF CONTROLLING FLEXIBLE DISPLAY DEVICE

(71) Applicant: Sony Corporation, Tokyo (JP)

(72) Inventor: Toshiki Moriwaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/510,723

(22) Filed: Oct. 9, 2014

(65) Prior Publication Data

US 2015/0022445 A1 Jan. 22, 2015

Related U.S. Application Data

(63) Continuation of application No. 12/950,388, filed on Nov. 19, 2010, now Pat. No. 8,890,911.

(30) Foreign Application Priority Data

Dec. 4, 2009 (JP) ................................. 2009-276944

(51) Int. Cl.
*G09G 5/02* (2006.01)
*G09G 5/00* (2006.01)
*G09G 3/34* (2006.01)
(Continued)

(52) U.S. Cl.
CPC ................ *G06F 1/1652* (2013.01); *G06F 3/03* (2013.01); *G09G 3/3208* (2013.01); *G06F 2203/04102* (2013.01); *G09G 3/22* (2013.01); *G09G 2300/0426* (2013.01); *G09G 2340/0464* (2013.01); *G09G 2380/02* (2013.01); *Y10S 345/903* (2013.01)

(58) Field of Classification Search
CPC .................... G06F 1/1652; G06F 3/03; G06F 2203/04102; G09G 3/3208; G09G 2380/02; G09G 3/22; G09G 2340/0464; G09G 2300/0426; Y10S 345/903
See application file for complete search history.

(56) References Cited

U.S. PATENT DOCUMENTS 6,819,304 B2 * 11/2004 Branson .......................... 345/1.3
7,109,967 B2 * 9/2006 Hioki et al. .................... 345/104

(Continued)

FOREIGN PATENT DOCUMENTS

CN 1321928 11/2001
CN 1573673 2/2005

(Continued)

OTHER PUBLICATIONS

European Search Report issued in corresponding EP Application No. 10014630 dated Jan. 12, 2011.

*Primary Examiner* — Lun-Yi Lao
*Assistant Examiner* — Ibrahim Khan
(74) *Attorney, Agent, or Firm* — Hazuki International, LLC

(57) ABSTRACT

A display device includes a flexible substrate, a display unit including multiple light-emitting elements arranged at the substrate and configured to display an image according to an image signal, a displacement sensor provided to at least one of a front surface and a back surface of the substrate and configured to detect a curved state of the substrate, and a control unit configured to execute a control by which the image is split and displayed in the display unit when a curve of the substrate is detected by the displacement sensor.

7 Claims, 9 Drawing Sheets

(51) Int. Cl.
  *G06F 1/16* (2006.01)
  *G09G 3/32* (2006.01)
  *G06F 3/03* (2006.01)
  *G09G 3/22* (2006.01)

(56) References Cited

U.S. PATENT DOCUMENTS

| | | |
|---|---|---|
| 7,782,274 B2 | 8/2010 | Manning |
| 2002/0190961 A1 | 12/2002 | Chen |
| 2003/0117382 A1 | 6/2003 | Pawlowski et al. |
| 2003/0227441 A1 | 12/2003 | Hioki et al. |
| 2006/0274036 A1 | 12/2006 | Hioki et al. |
| 2007/0205997 A1 | 9/2007 | Lieshout et al. |
| 2008/0291225 A1 | 11/2008 | Arneson |

FOREIGN PATENT DOCUMENTS

| | | |
|---|---|---|
| CN | 1584919 | 2/2005 |
| CN | 1725166 A | 1/2006 |
| CN | 101403839 | 4/2009 |
| JP | 11-112905 | 4/1999 |
| JP | 11-134087 | 5/1999 |
| JP | 11-143606 | 5/1999 |
| JP | 11-312040 | 11/1999 |
| JP | 2002-278515 | 9/2002 |
| JP | 2003-015795 | 1/2003 |
| JP | 2004-021528 | 1/2004 |
| JP | 2005-173193 | 6/2005 |
| JP | 2007-048237 | 2/2007 |
| JP | 2007-240617 | 9/2007 |
| TW | 579019 | 3/2004 |
| TW | 200844925 | 11/2008 |
| WO | WO/2008/075277 | 6/2008 |

\* cited by examiner

| AMOUNT DETECTED BY DISPLACEMENT SENSOR | OUTPUT STEP CONTROL VALUE |
|---|---|
| 0 | 0 |
| 0.1 V | 0 |
| 0.2 V | 0 |
| 0.3 V | 60% REDUCTION, SPLIT INTO TWO |
| 0.4 V | 60% REDUCTION, SPLIT INTO TWO |
| ⋮ | ⋮ |
| 0.8 V | 35% REDUCTION, SPLIT INTO THREE |
| ⋮ | ⋮ |

FLEXIBLE DISPLAY DEVICE AND METHOD OF CONTROLLING FLEXIBLE DISPLAY DEVICE

RELATED APPLICATION DATA

This application is a continuation of U.S. patent application Ser. No. 12/950,388 filed Nov. 19, 2010, the entirety of which is incorporated herein by reference to the extent permitted by law. The present application claims the benefit of priority to Japanese Patent Application No. JP 2009-276944 filed on Dec. 4, 2009 in the Japan Patent Office, the entirety of which is incorporated by reference herein to the extent permitted by law.

BACKGROUND OF THE INVENTION

1. Field of the Invention

The present invention relates to a display device and a method of controlling a display device.

2. Description of the Related Art

In recent years, ensuring reliability of a display element in a display device has become an extremely important challenge. Particularly, ensuring structural and mechanical reliability or reliability relating to display performance is still a crucial matter as has been in the past.

For example, Japanese Unexamined Patent Application Publication No. 2005-173193 discloses a technique in which a situation of an image is determined from data, such as image data, that can indicate a display state of a device and lighting of a horizontal scan line is controlled to prevent overcurrent, in order to prevent life degradation of an element due to temperature rise according to current flow amount.

Also, Japanese Unexamined Patent Application Publication No. 2007-240617 describes that a control of an optical characteristic such as refractive index is performed using a photodetector as a polarization detecting unit by quantitatively detecting a change amount of deformation due to minute stress applied to a display device as a change in polarization state of incident light.

SUMMARY OF THE INVENTION

However, the technique described in Japanese Unexamined Patent Application Publication No. 2005-173193 has a problem in that manufacturing cost increases in order to ensure reliability, since various feedback controls are used, i.e., many algorithms are used, for a complex control combining both a gate signal and a source signal, control of lighting period, and the like. Also, a complex algorithm control leads to an increase in power consumption of a driver IC, causing a decrease in power performance.

With the technique described in Japanese Unexamined Patent Application Publication No. 2007-240617, detecting a minute refractive index according to deformation is difficult when there is noise due to reflection of external light or light scattering by relatively strong external light from another light source such as, for example, sunlight or fluorescent light in a room.

Thus, it is desirable to provide a novel and improved display device and method of controlling a display device capable of ensuring reliability of display at the time of curving of a flexible display device by performing a display control according to a curve amount at the time of curving.

According to an embodiment of the present invention, there is provided a display device including a flexible substrate, a display unit including multiple light-emitting elements arranged at the substrate and configured to display an image according to an image signal, a displacement sensor provided to at least one of a front surface and a back surface of the substrate and configured to detect a curved state of the substrate, and a control unit configured to execute a control by which the image before curving is split and displayed in the display unit when a curve of the substrate is detected by the displacement sensor.

The control unit may control a split of the image displayed in the display unit according to a curve amount of the substrate.

The control unit may control the split of the image displayed in the display unit according to the curve amount of the substrate and a curve position of the substrate.

The display device may further include an image region arithmetic unit configured to calculate a split amount and a reduction percentage of an image region based on a lookup table specifying a relation between an output of the displacement sensor and an image split control amount. The control unit may control the split of the image displayed in the display unit based on the split amount and the reduction percentage of the image region calculated by the image region arithmetic unit.

When the substrate is bending, the control unit may control a split of the image displayed in the display unit in a moderate manner compared to when the substrate is recovering.

When the curve is such that a display surface of the display unit is a convex portion in a result of detection of the curved state by the displacement sensor, the control unit may control a split of the image displayed in the display unit in a moderate manner compared to when the curve is such that the display surface of the display unit is a concave portion.

The displacement sensor may include a pair of transparent electrodes formed of ITO or IZO and be configured to detect the curved state of the substrate based on a change in resistance value between the pair of transparent electrodes.

According to another embodiment of the present invention, there is provided a method of controlling a display device, including the steps of detecting a curved state of a flexible substrate provided with a display unit configured to display an image according to an image signal, and executing a control by which the image before curving is split and displayed in the display unit when a curve of the substrate is detected in the step of detecting the curved state.

According to the embodiments of the present invention described above, it is possible to provide a novel and improved display device and method of controlling a display device capable of ensuring reliability of display at the time of curving by performing a display control according to a curve amount at the time of curving, when an image in the flexible display device is bent to cause a decrease in visibility and a decrease in the amount of image information provided to the user side.

DESCRIPTION OF THE PREFERRED EMBODIMENTS

Figure 1:
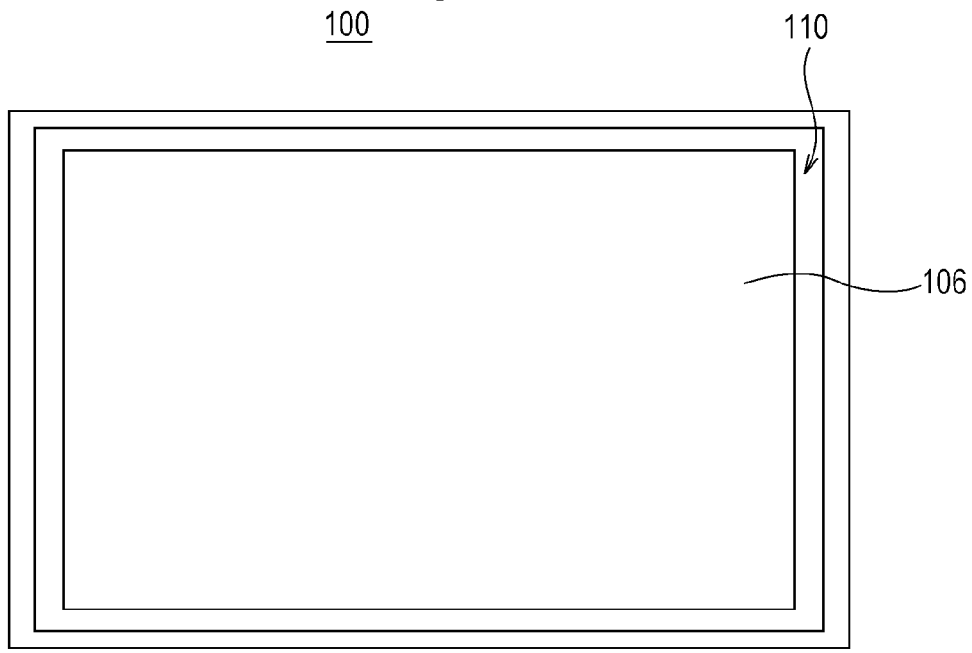
FIG. 1 is a plan view showing a surface on the front side of a display device according to an embodiment of the present invention.

A preferred embodiment of the present invention will be described in detail below with reference to the accompanying drawings. Note that, in this specification and the drawings, components having substantially the same functional configuration are denoted by the same reference numeral to omit redundant description.

Note that descriptions will be given in the following order.
[1. Configuration example of display device]
[2. Function block configuration of display device]
[3. Function block configuration of control unit]
[4. Configuration example in which displacement sensor is provided to front and back surfaces]
[5. Another example of lookup table]
[1. Configuration Example of Display Device]

Figure 2:
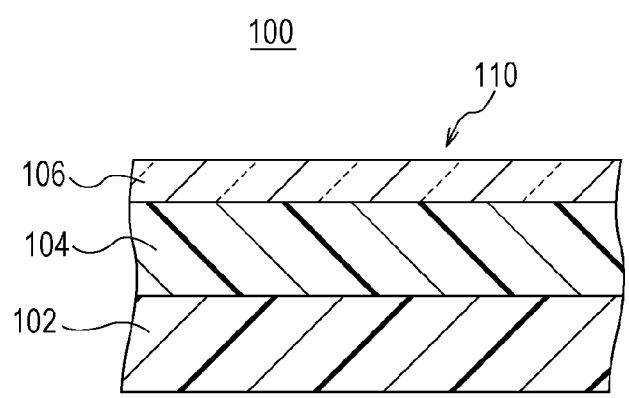
FIG. 2 is a schematic view showing a sectional surface of the display device.

First, with reference to FIGS. 1 and 2, a schematic configuration of a display device 100 according to an embodiment of the present invention is described. FIG. 1 is a plan view showing a surface on the front side of the display device 100. The display device 100 includes a display unit 110 including a semiconductor layer described later and in which multiple pixels are arranged in a matrix. The display unit 110 displays an image such as a still image or a moving image by causing each pixel to emit light according to an image signal.

In this embodiment, a flexible characteristic allows for a free curving movement. At the same time, reliability of display is ensured by performing, in response to a curving and to suit a bend-degree amount, a split/reduction control by which an image to be displayed is split and displayed in the display unit 110 of the display device 100 according to a detected displacement amount.

FIG. 2 is a schematic view showing a sectional surface of the display device 100. In this embodiment, as shown in FIG. 2, a first substrate 102, a second substrate 104, and a displacement sensor 106 are stacked to form the extremely thin display device 100 having a thickness of approximately several tens of micrometers. The first substrate 102 is configured with a display element (light-emitting element), which is included in each pixel, formed on a flexible substrate, e.g., a plastic substrate formed of resin. As the display element, an organic semiconductor or inorganic semiconductor element that can be formed by a low-temperature process may be used. In this embodiment, an organic electroluminescence (EL) element is formed as the display element in the first substrate 102.

The second substrate 104 is also formed of a plastic substrate formed of resin, is arranged to face the first substrate 102 including the display element formed of an organic semiconductor or an inorganic semiconductor, and has a function as a sealing substrate that seals in the display element. In this manner, the display device 100 is formed by two types of substrates, i.e., the first substrate 102 and the second substrate 104, holding the semiconductor layer in between in this embodiment. The display unit 110 displays an image on a surface on the second substrate 104 side. With such a configuration, the display device 100 is formed with a thickness of approximately several tens of micrometers, has flexibility, and can be curved freely in a state where an image is displayed.

As shown in FIGS. 1 and 2, the displacement sensor 106 formed of a transparent electrode body, e.g., an indium tin oxide (ITO) film or an indium zinc oxide (IZO) film, is arranged on a surface of the second substrate 104. The displacement sensor 106 is formed, for example, in a same region as the display unit 110. The displacement sensor 106 is formed of the transparent electrode body, and is each arranged to face the display element of the first substrate 102.

The displacement sensor 106 has a configuration similar to, for example, an electrode for an available touchscreen. Two metal thin films (resistance films) formed of a transparent electrode of ITO, IZO, or the like are arranged to face each other, and multiple pairs of the metal thin films are arranged, for example, in a matrix in a flat surface region. The facing transparent electrodes of the displacement sensor 106 have resistance. One of the electrodes is applied with predetermined voltage, and a resistance value between the electrodes is monitored. With such a configuration, a change in the resistance value can be detected because, when the display device 100 is curved, the resistance value between the two metal thin films changes at a position of a curve and voltage according to the curve is generated at the other electrode. Thus, by detecting the metal thin films for which the resistance value has changed out of the multiple pairs of the metal thin films arranged in the matrix, a position of displacement among the displacement sensors 106 can be detected and a position of bend in the display unit 110 can be detected. The change in the resistance value increases as a bend amount of the display device 100 increases. In this manner, the display device 100 can detect a resistance change amount detected by the displacement sensor 106 and detect a bend position and the bend amount of the display device 100.

Figure 3:
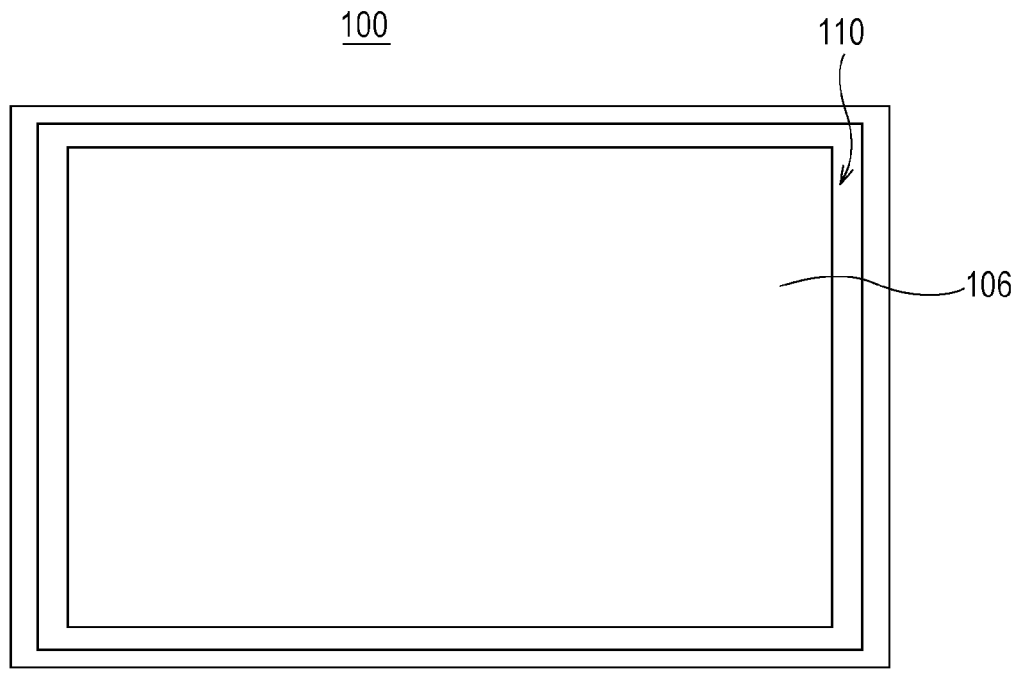
FIG. 3 illustrates an example in which a displacement sensor is provided to the back surface side of a display unit, and is a plan view showing a back surface of the display device.
Figure 4:
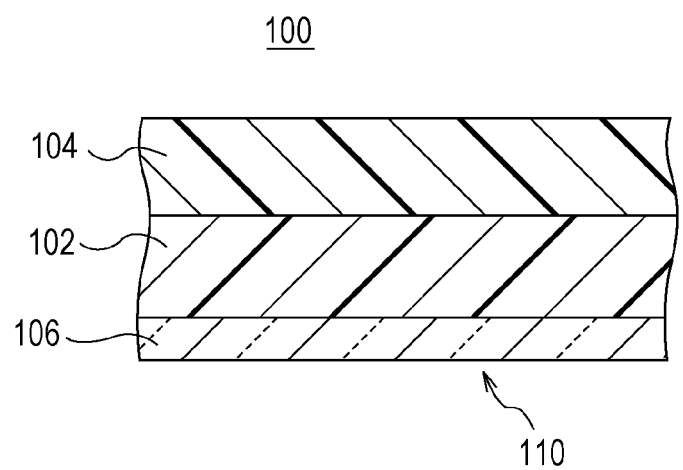
FIG. 4 illustrates the example in which the displacement sensor is provided to the back surface side of the display unit, and is a schematic view showing a sectional surface of the display device.

FIGS. 3 and 4 are schematic views showing an example in which the displacement sensor 106 is provided to the back surface side of the display unit 110. Herein, FIG. 3 shows a plan view of a back surface of the display device 100, and FIG. 4 shows a sectional view of the display device 100. In FIGS. 3 and 4, the configuration of the first substrate 102 and the second substrate 104 is similar to that in the display device 100 in FIGS. 1 and 2. In this configuration example, as shown in FIG. 4, the displacement sensor 106 is provided to a back surface of the first substrate 102. A curve amount and a curve position of the display device 100 can be detected according to a change in the resistance value also when the displacement sensor 106 is provided to the back surface of the display unit 110, in a similar manner to when the displacement sensor 106 is provided to a front surface of the display unit 110.

The schematic configuration of the display device 100 according to the embodiment of the present invention has been described above. The display device 100 shown in FIGS. 1 to 4 has, as described above, a thickness of approximately several tens of micrometers and flexibility. Thus, a user can cause the display device 100 to curve. However, in a state where the display device 100 is curved, there is less possibility of maintaining a display state equivalent to that without a curve. This is because the visibility of the display unit 110 decreases due to the curve of the display device 100.

Figure 5:
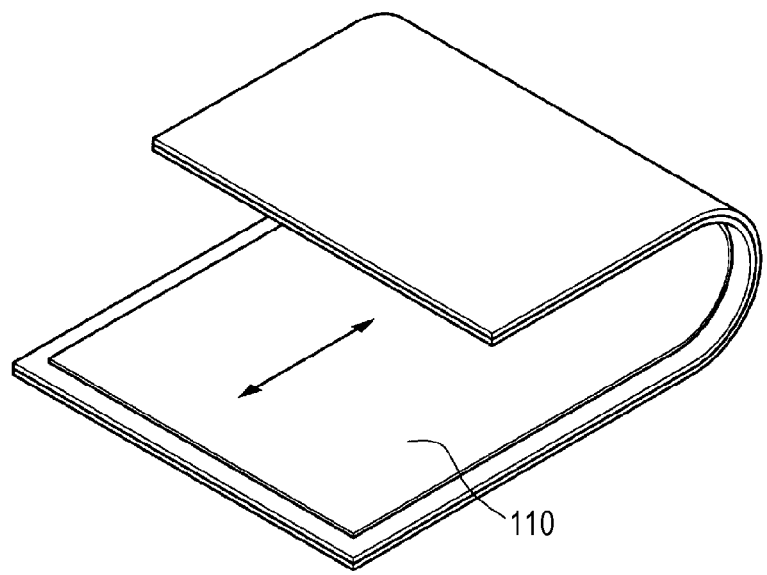
FIG. 5 illustrates a state where the display device is curved, and is a schematic view showing a curved state where the surface on the front side provided with the display unit is a concave surface.
Figure 6:
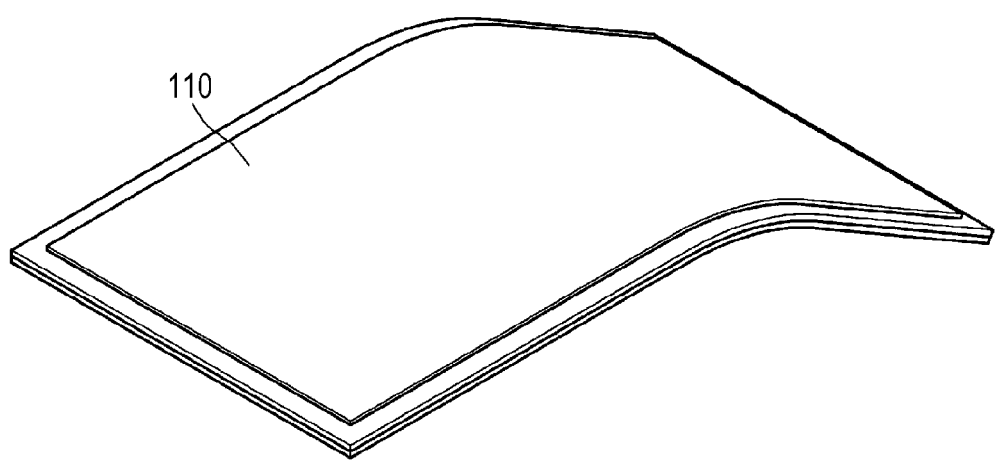
FIG. 6 is a schematic view showing a curved state where the surface provided with the display unit is a convex surface.

FIG. 5 is a schematic view showing the state where the display device 100 is curved, and shows a curved state where the surface on the front side provided with the display unit 110 is a concave surface. FIG. 6 shows a curved state where the surface provided with the display unit 110 is a convex surface.

In the state where the display device 100 is curved as shown in FIGS. 5 and 6, it is less important to maintain a normal display state of an image since the visibility of the display unit 110 is reduced by the curve. For example, as in FIG. 5, the image on a display screen is also curved when the curve is such that the display screen is the concave surface. Also, due to the influence of light scattering or the like on the surface, the image quality also decreases compared to when the surface is a flat surface. Therefore, in order to increase the visibility for the user, the display device 100 executes a control by which the image at the time of curving is split and displayed in the display unit 110.

Since there is a region where the image of the display unit 110 is not visible from the outside particularly when the display screen of the display unit 110 is bent by an angle of approximately 180 degrees as in FIG. 5, the visibility for the user can be ensured by executing a control of reducing an image display region. In a similar manner, since the image on the display screen is also curved and the image quality decreases when the curve is such that the display screen of the display unit 110 is the convex surface as in FIG. 6, the visibility for the user can be ensured by the display device 100 executing a control by which the image at the time of curving is reduced and split to be displayed in an uncurved portion of the display unit 110. In this embodiment, when the display unit 110 is curved, the control with respect to the image displayed in the display unit 110 is performed in this manner in consideration of the less importance of maintaining an image display state before the curving. Specifically, as described above, the control by which the image at the time of curving is reduced and split to be displayed in the uncurved portion is executed in order to increase the visibility for the user. That is, the control is executed so that the image is displayed in the uncurved portion of the display unit 110.

Accordingly, it is possible to ensure reliability of display at the time of curving of the flexible display device 100 without giving the user a sense of strangeness.

[2. Function Block Configuration of Display Device]

Figure 7:
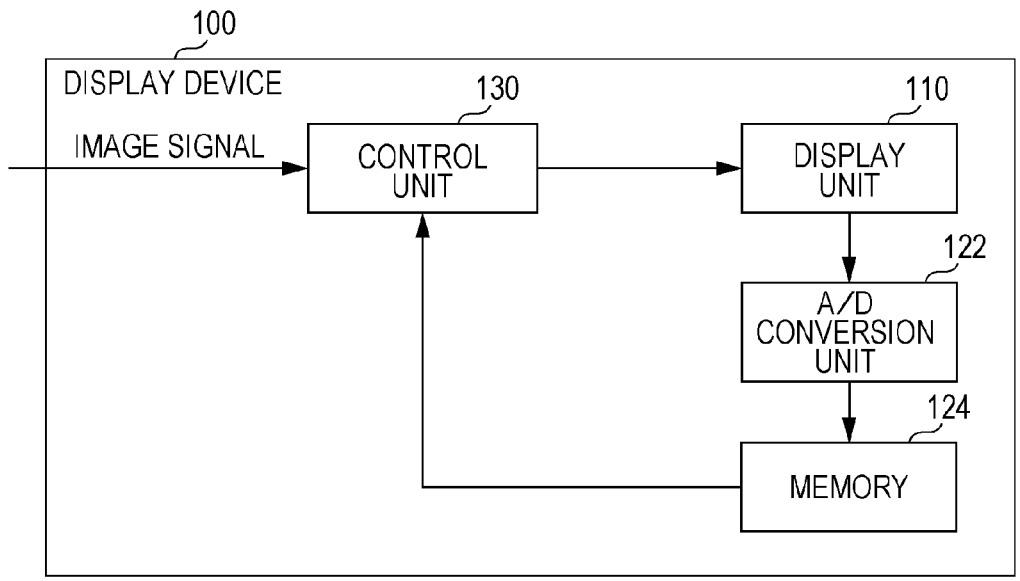
FIG. 7 is a block diagram showing the functional configuration of the display device according to this embodiment.

A specific control technique is described below. FIG. 7 is a block diagram showing the functional configuration of the display device 100 according to this embodiment. The function block configuration of the display device 100 is described below using FIG. 7.

As shown in FIG. 7, the display device 100 according to this embodiment includes the display unit 110, an A/D conversion unit 122, a memory 124, and a control unit 130. As shown in FIGS. 1 to 4, the display unit 110 has a structure in which the first substrate 102, the second substrate 104, and the displacement sensor 106 are stacked. The A/D conversion unit 122 converts a curve amount of the display unit 110 detected as an analog quantity by the displacement sensor 106 to a digital quantity. The memory 124 temporarily stores the curve amount of the display unit 110 which is converted to the digital quantity by the A/D conversion unit 122. The control unit 130 executes various controls with respect to an image signal supplied to the display unit 110 using the curve amount of the display unit 110 stored in the memory 124.

As described above, the displacement sensor 106 is formed of the transparent ITO film, IZO film, or the like. The ITO film or the IZO film has resistance. When voltage is applied to one resistance film of the two facing resistance films, voltage according to a position of operation by the user with respect to the display unit 110 is generated also at the other one of the facing resistance films. By detecting this voltage, the displacement sensor 106 can detect an operation position as the analog quantity. Thus, the curve amount of the display unit 110 detected as the analog quantity by the displacement sensor 106 can be used by the control unit 130 in determining whether the display unit 110 is curved.

Note that although the curve amount of the display unit 110 converted to the digital quantity by the A/D conversion unit 122 is temporarily stored in the memory 124 in the configuration shown in FIG. 7, embodiments of the present invention are not limited to this example. For example, the configuration may be such that the curve amount of the display unit 110 converted to the digital quantity by the A/D conversion unit 122 is directly supplied to the control unit 130.

[3. Function Block Configuration of Control Unit]

Figure 8:
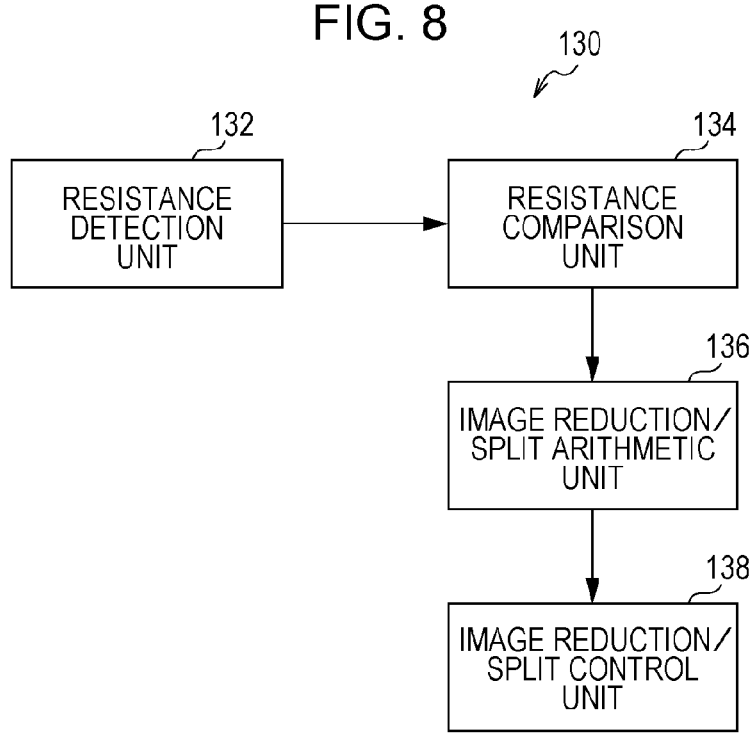
FIG. 8 is a block diagram showing the functional configuration of a control unit according to this embodiment.

The function block configuration of the display device 100 has been described above using FIG. 7. Next, the function block configuration of the control unit 130 shown in FIG. 7 is described. FIG. 8 illustrates the function block configuration of the control unit 130.

A function block of the control unit 130 shown in FIG. 8 includes hardware, such as a sensor or a circuit, or a central processing unit (CPU) with software (program) for enabling a function thereof. As shown in FIG. 8, the control unit 130 includes a resistance detection unit 132, a resistance comparison unit 134, an image reduction/split arithmetic unit 136, and an image reduction/split control unit 138.

The resistance detection unit 132 detects the resistance value output from the displacement sensor 106. The resistance value detected by the resistance detection unit 132 is sent to the resistance comparison unit 134.

The resistance comparison unit 134 compares a reference resistance value in a flat surface state where the display device 100 is not curved and the resistance value detected by the resistance detection unit 132. By comparing the resistance values and calculating the change amount of the resistance value with the resistance comparison unit 134, the degree of the curve of the display device 100 can be detected. Information of the change amount of the resistance value calculated by the resistance comparison unit 134 is sent to the image reduction/split arithmetic unit 136.

The image reduction/split arithmetic unit 136 uses the change amount of the resistance value calculated by the resistance comparison unit 134 to determine and output an image split control amount to be used in an image split control process by the image reduction/split control unit 138 at a later stage. The image split control amount used in the image split control process includes information of a split amount of the image and a reduction percentage of the image. When the resistance comparison unit 134 detects a certain detection voltage, the image reduction/split arithmetic unit 136 determines that the display unit 110 is not in a proper state capable of a normal image display and performs an arithmetic operation to determine how to split the image at the time of curving to be displayed in the display unit 110. The image reduction/split control unit 138 uses the image split control amount determined by the image reduction/split arithmetic unit 136 to execute the image split control process of controlling a pattern of a split or a reduction amount of the image to be displayed in the display unit 110. The image reduction/split arithmetic unit 136 may determine the image split control amount in a region corresponding to a curved portion in which a resistance change is detected among the multiple displacement sensors 106 arranged in the matrix. Then, the image reduction/split control unit 138 may execute the image split control process in the region corresponding to the curved portion based on position information, which is input from the resistance comparison unit 134, of the displacement sensor 106 where the resistance change has occurred.

Figures 9, 10:
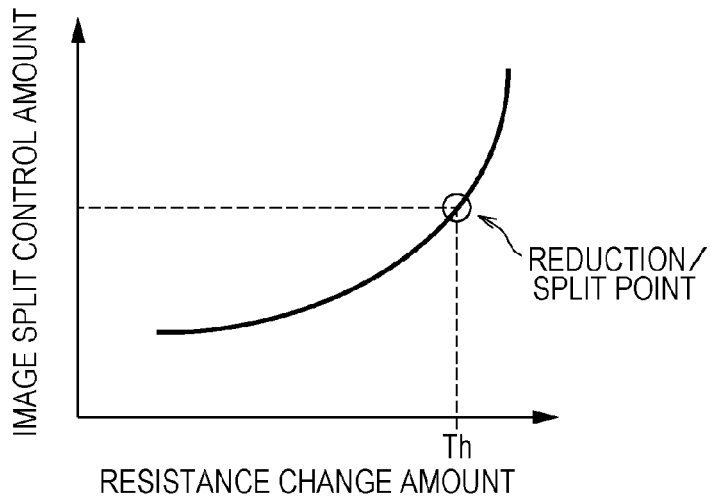
FIG. 9 is a schematic view showing an example of an LUT specifying an image split control amount according to a resistance change amount.
FIG. 10 is a schematic view showing another example of the LUT specifying the image split control amount.

In the image reduction/split arithmetic unit 136, the image split control amount to be controlled according to the resistance change amount is stored in advance in the form of a lookup table (LUT). FIG. 9 illustrates an example of a relation between the resistance change amount and the image split control amount stored in the form of the lookup table. In this embodiment, the image split control process is performed using data stored in advance as shown in FIG. 9. When the resistance change amount is small, the image split control amount is set to be small, i.e., the image is displayed in the display unit 110 without splitting, as shown in FIG. 9. As the resistance change amount increases, the image split control amount is set to increase, i.e., the image is split and displayed in the display unit 110. Accordingly, when the bend of the display unit 110 is great, the image can be split and displayed in an uncurved region of the display unit 110 by increasing the image split control amount, i.e., increasing the split amount or the reduction amount, to ensure the visibility of the display unit 110 and maintain the display performance at a high level. On the other hand, when the curve amount of the display unit 110 is small, it is possible to largely display the image of the display unit 110 or prevent an image split control from being recognized by the user by not splitting the image or reducing the image split control amount, i.e., reducing the split amount or the reduction amount.

FIG. 10 is a schematic view showing another example of the LUT specifying the image split control amount. In the example shown in FIG. 10, a relation between a voltage value (value corresponding to the resistance value) detected by the displacement sensor 106 and the image split control amount is specified. When a predetermined voltage is applied to one of the transparent electrodes of the displacement sensor 106, the voltage value with respect to a reference voltage of the other electrode of the displacement sensor 106 increases as the curve amount increases, the reference voltage being a voltage value of the other electrode in the state where the display device 100 is not curved. Thus, the image split control amount can be obtained by looking up the voltage value with respect to the reference voltage of the other electrode of the displacement sensor 106 in the LUT in FIG. 10.

For example, assume that, at an arbitrary point (position) among the displacement sensors 106, the resistance comparison unit 134 detects a difference of 0.3 V between a detected voltage value of the transparent electrode of the displacement sensor 106 and the reference voltage for when the curve is not present. In this case, the image reduction/split arithmetic unit 136 calculates the image split control amount according to a detected difference amount and, in the example shown in FIG. 10, determines the image split control amount as "60% reduction, split into two". Then, the image reduction/split control unit 138 executes the image split control of reducing an image region by 10%. By executing the image split control with the image reduction/split control unit 138, a possible defect caused by mechanical stress due to the curve of the display unit 110 can be prevented from increasing due to a certain output being applied to a high current density region. Also, it is possible to guarantee a certain quality level of display characteristics and ensure the visibility at the time of curving by displaying the split and reduced image in the uncurved portion of the display unit 110.

Note that the image split control may be not performed in a predetermined range where the resistance change amount is small. For example, as shown in FIG. 9, the lookup table may specify that the image split control amount is zero in the predetermined range where the resistance change amount is small and the image split control starts when the resistance change amount exceeds a predetermined threshold value Th. By setting a deadband before the image split control actually starts in this manner, the image split control can be not performed when the display device 100 is curved minutely. Accordingly, since the image split control is not performed with a minute deformation of the display device 100, the user can be prevented from feeling a sense of strangeness.

Also, each parameter of the LUT, specifying the relation between the voltage detected as a result of comparison by the resistance comparison unit 134 and the image split control amount, may be changeable to an arbitrary value.

Figure 11:
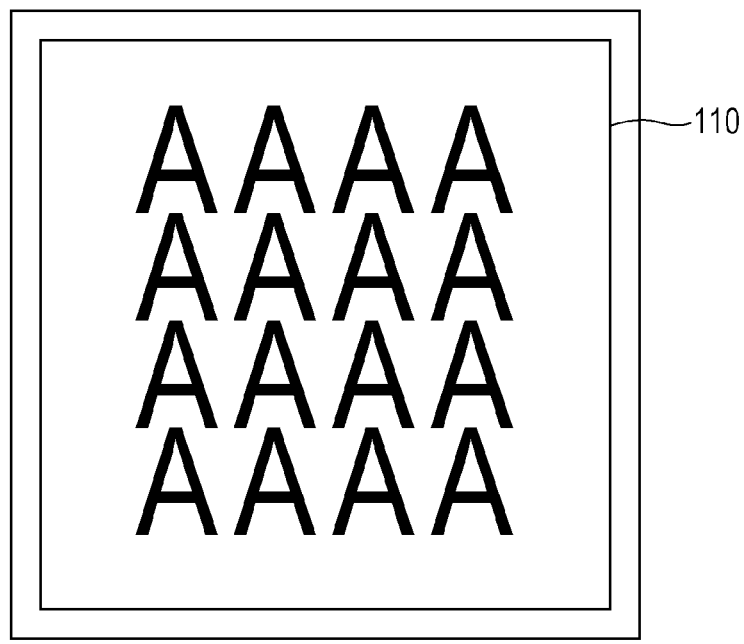
FIG. 11 is a schematic view showing a display example in a state where the display device is not curved.
Figure 12:
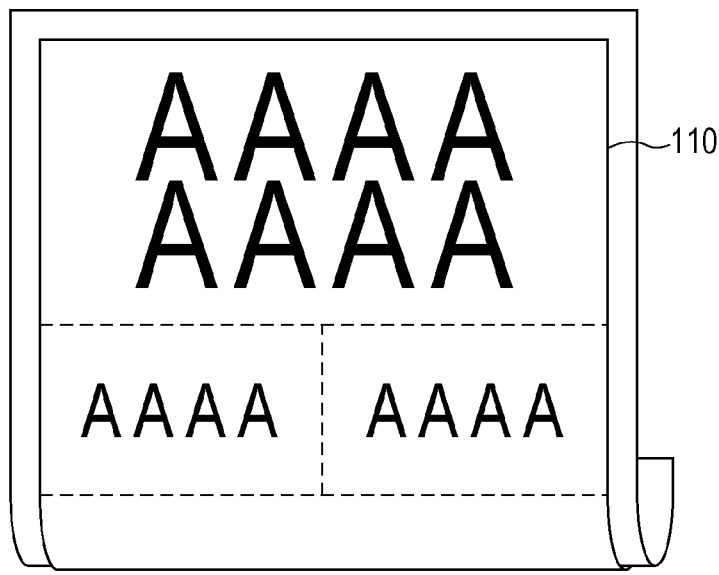
FIG. 12 is a schematic view showing an application of a split control to a display region in the display unit according to a curve amount of the display device.
Figure 13:
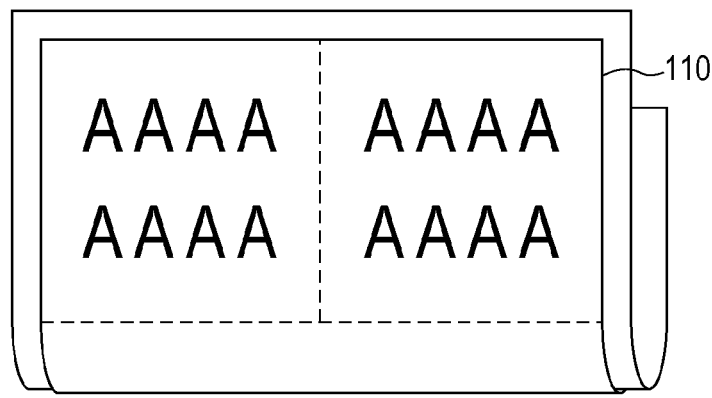
FIG. 13 is a schematic view showing an application of the split control to the display region in the display unit according to the curve amount of the display device.

FIG. 11 is a schematic view showing a display example in a state where the display device is not curved. FIGS. 12 and 13 are schematic views showing applications of the image split control by the image reduction/split control unit 138 according to the curve amount of the display device 100. FIG. 12 schematically shows a change in the image displayed in the display unit 110 when the display device 100 is curved slightly, and FIG. 13 schematically shows a change in the image displayed in the display unit 110 when the display device 100 is curved greatly.

Since the display device 100 has a large uncurved portion when the display device 100 is curved slightly, as shown in FIG. 12, the image split control is executed according to the curve amount of the display device 100 and the size of the display region of the display unit 110 is controlled by the control unit 130 to display the image in the uncurved portion of the display device 100.

Since the display device 100 has a small uncurved portion when the display device 100 is curved greatly, as shown in FIG. 13, the image split control with respect to the image displayed in the display unit 110 is controlled by the control unit 130 according to the curve amount of the display device 100 to display the image in the uncurved portion of the display device 100.

By executing the image split control according to the curve amount of the display device 100 with the control unit 130 in this manner, the entire image intended for display can be displayed in the display unit 110 by splitting the image and using the uncurved portion of the display device 100 even in the state where the display device 100 is curved.

Figure 14:
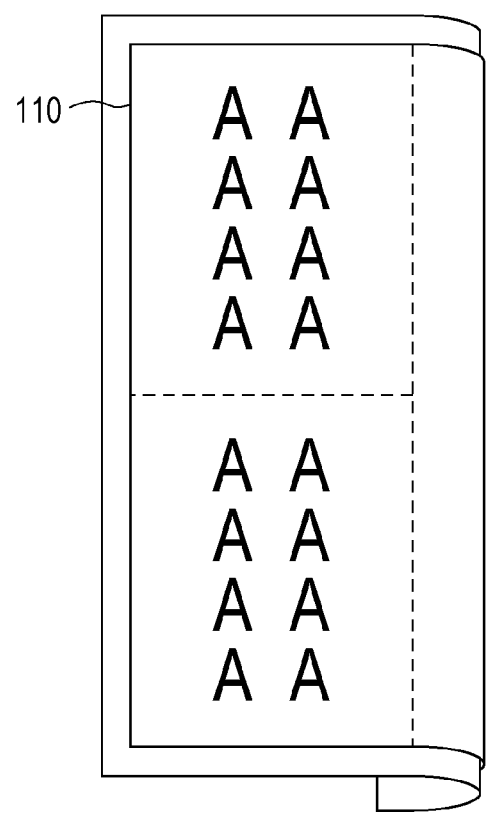
FIG. 14 is a schematic view showing an application of the split control to the display region in the display unit according to a curve position of the display device.
Figure 15:
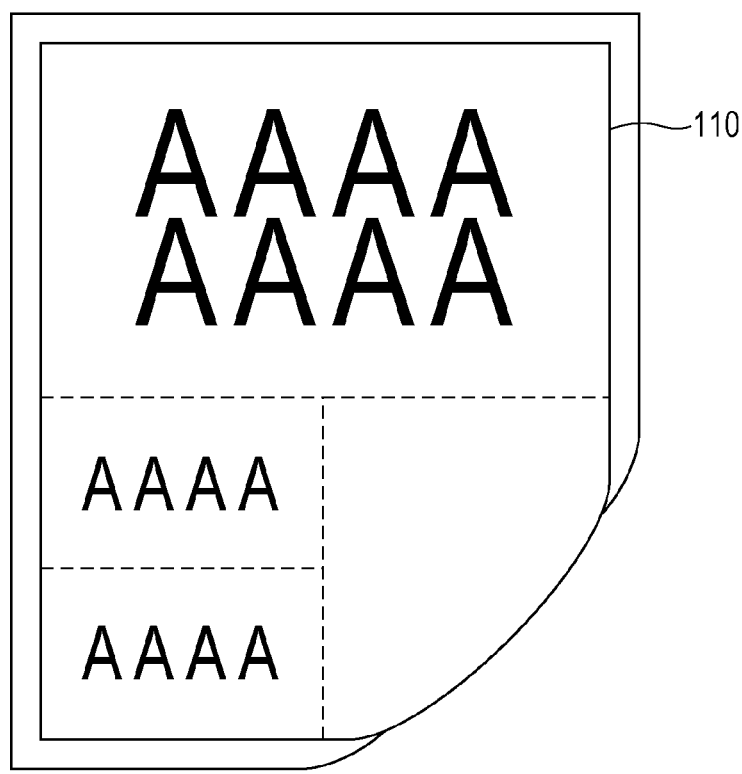
FIG. 15 is a schematic view showing an application of the split control to the display region in the display unit according to the curve position of the display device.

Note that, in the embodiment of the present invention, the control unit 130 may execute the image split control according to the curve position of the display device 100. FIGS. 14 and 15 are schematic views showing applications of a control of the size of the display region of the display unit 110 by the image reduction/split control unit 138 according to the curve position of the display device 100. FIG. 14 schematically shows a difference in a splitting pattern of the image displayed in the display unit 110 when, unlike in FIG. 12, the display device 100 is curved along a longitudinal direction. FIG. 15 schematically shows a difference in the splitting pattern of the image displayed in the display unit 110 when one corner of the display device 100 is curved.

In this manner, the control unit 130 may execute the image split control reflecting the difference in location of the curve even if the curve amount is the same. Since the displacement sensors 106 are arranged in the matrix in the display device 100 as described above, the displacement sensor 106 can acquire not only the curve amount but also the curve position.

[4. Configuration Example in which Displacement Sensor is Provided to Front and Back Surfaces]

Figure 16:
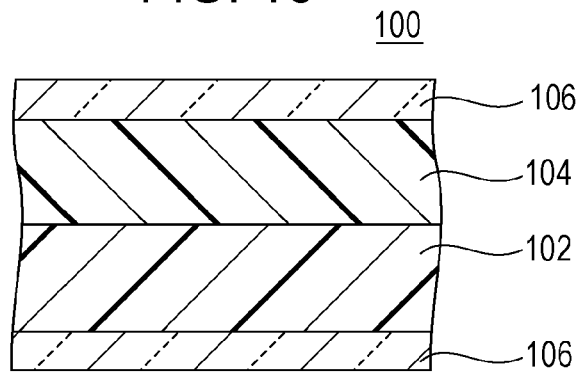
FIG. 16 illustrates a sectional surface of the display device, and is a schematic view showing a configuration example in which the displacement sensor is provided to front and back surfaces of the display device.
Figure 17:
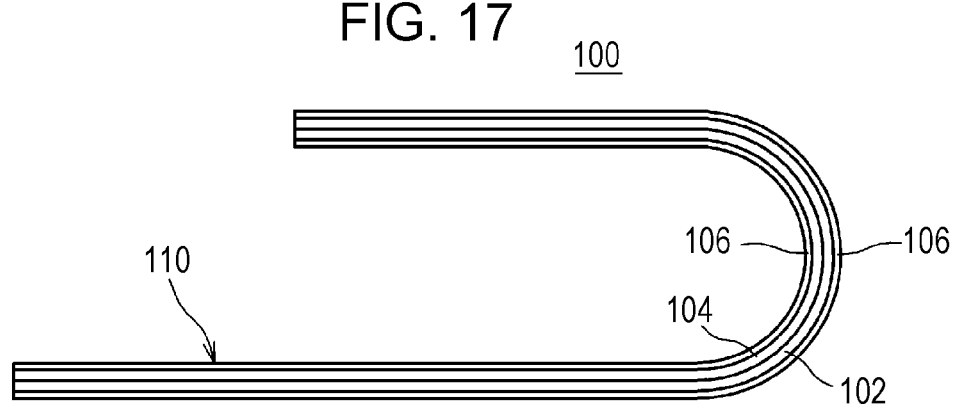
FIG. 17 is a schematic view showing a state where the display device shown in FIG. 16 is curved.

FIG. 16 is a schematic view showing a sectional surface of the display device 100, and shows a configuration example in which the displacement sensor is provided to front and back surfaces of the display device 100. FIG. 17 is a schematic view showing a state where the display device 100 shown in FIG. 16 is curved. In the curved portion in the case of FIG. 17, a radius of curvature of the displacement sensor 106 on the back surface side where the display unit 110 is not provided is greater than a radius of curvature of the displacement sensor 106 on the front surface side where the display unit 110 is provided. More specifically, the radius of curvature of the displacement sensor 106 on the back surface side is greater by the thickness of the first substrate 102 and the second substrate 104. Therefore, a curve amount of the displacement sensor 106 on the front surface side is greater compared to a curve amount of the displacement sensor 106 on the back surface side, and the resistance change amount of the displacement sensor 106 on the front surface side where the curve amount is greater is greater than the resistance change amount of the displacement sensor 106 on the back surface side.

Thus, when the resistance change amounts are detected by the displacement sensors 106 on the front and back surfaces in the configuration shown in FIG. 16, comparing the resistance change amounts of the front and back surfaces allows one of the front and back surfaces to be detected as a concave surface and the other as a convex surface. When the front surface is the concave surface, it is possible to increase the image split control amount in order to increase the visibility of the image displayed in the display unit 110, since the display unit 110 is more hidden from the outside compared to when the front surface is the convex surface and the display unit 110 is less recognizable. On the other hand, when the front surface is the convex surface, it is possible to differentiate the split amount and the reduction percentage of the image between a case where the front surface is the convex surface and a case where the front surface is the concave surface by reducing the image split control amount compared to when the front surface is the concave surface even if the curve amount is the same, since the visibility of the image increases compared to when the front surface is the concave surface despite the image being curved.

[5. Another Example of Lookup Table]

Figure 18:
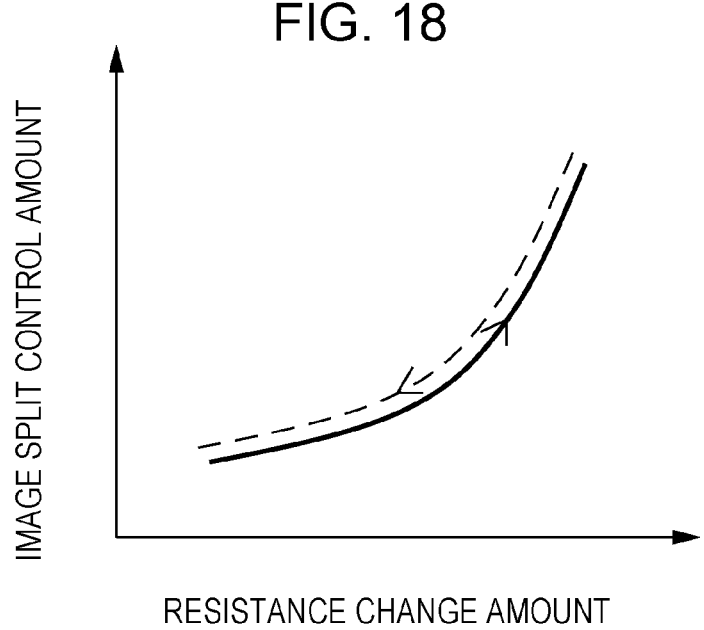
FIG. 18 is a schematic view showing another example of the lookup table.

FIG. 18 is a schematic view showing another example of the lookup table. In the example shown in FIG. 18, the image split control amounts with respect to the resistance change amount are different in a process in which the display device 100 is bent and a process in which a bend is recovered.

In the lookup table shown in FIG. 18, a characteristic curve (shown by a solid line in FIG. 18) in the process in which the display device 100 is bent is similar to that in FIG. 9. On the other hand, a characteristic curve shown by a broken line in FIG. 18 is applied in the process in which the bend is recovered, so that a change amount of the image split control amount with respect to the resistance change amount is greater in a region in which the resistance change amount is great and the change amount of the image split control amount with respect to the resistance change amount is smaller in a region in which the resistance change amount is small. Accordingly, when a bent state recovers to a flat surface, an image applied with the image split control can recover to an original state at a relatively early stage. Thus, the image split control can be prevented reliably from giving the user a sense of strangeness when the curved display device 100 recovers to the flat surface.

The present application contains subject matter related to that disclosed in Japanese Priority Patent Application JP 2009-276944 filed in the Japan Patent Office on Dec. 4, 2009, the entire contents of which are hereby incorporated by reference.

The preferred embodiment of the present invention has been described above in detail with reference to the accompanying drawings. However, the present invention is not limited to the examples. It is clear to those skilled in the art to which the present invention pertains that various modifications or alterations are conceivable within the scope of the technical idea described in the embodiment of the present invention, and it should be understood that they are also naturally within the technical scope of the present invention.

What is claimed is:

1. A display device, comprising:
    a flexible substrate that when bent has a curved portion and an uncurved portion;
    a display unit including multiple light-emitting elements arranged on the substrate and configured to display an image within a display area according to an image signal;
    a displacement sensor secured to a front surface, a back surface or both of the substrate and configured to detect a state of curvature of the substrate;
    a control unit configured to control the image signal in accordance with the state of curvature detected by the displacement sensor and to (i) size the image to fit within the uncurved portion of the flexible substrate, (ii) split the display area into at least two split areas, the number of split areas being in inverse relation to the size of the uncurved portion and (iii) simultaneously display within each split area a portion of the image, thereby displaying a split image; and
    an image region arithmetic unit configured to calculate a split amount and a reduction percentage of an image region based on a lookup table specifying a relation between an output of the displacement sensor and an image split control amount,
    wherein,
    the control unit controls the image signal according to an amount and position of the curvature of the substrate, the control unit is configured to split the image displayed in the display unit differently than when the substrate is recovering and the image is changed to an original state, and the control unit controls the split of the image displayed in the display unit based on the split amount and the reduction percentage of the image region calculated by the image region arithmetic unit.

2. The display device according to claim 1, wherein the control unit is configured to split the image displayed in the display unit differently than when the substrate is recovering and the image is changed to an original state.

3. The display device according to claim 1, wherein when the curve causes a display surface of the display unit to assume a convex portion, the control unit is configured to split the image displayed in the display unit differently than when the curve causes the display surface to assume a concave portion and the control unit splits the image displayed in the display unit.

4. The display device according to claim 1, wherein the displacement sensor includes a pair of transparent electrodes formed of ITO and IZO and is configured to detect the curved state of the substrate based on a change in resistance value between the pair of transparent electrodes.

5. The display device according to claim 1, wherein the at least two images in the display unit collaboratively display an entirety of the image displayed by the display unit before the state of curvature of the substrate was detected.

6. The display device according to claim 1, wherein:
the control unit is configured to (i) execute the control to split the image into at least three portions of the image and (ii) display the at least three portions of the image in the display unit when a curve of the substrate is detected by the displacement sensor, and the at least three portions of the image collaboratively display an entirety of the image displayed before the curve of the substrate was detected.

7. The display device according to claim 6, wherein a first display region of a first one of the three portions of the image is sized (i) different than a second display region of a second one of the three portions of the image, and (ii) the same as a third display region of a third one of the three portion of the image.

* * * * *